US006968960B1

(12) United States Patent
Maliniak

(10) Patent No.: US 6,968,960 B1
(45) Date of Patent: Nov. 29, 2005

(54) DIGITAL VIDEO DISC HOLDING ASSEMBLY

(76) Inventor: Katie L. Maliniak, C/o Valerie Hill, 6320 Spruce La., Westland, MI (US) 48185

(*) Notice: Subject to any disclaimer, the term of this patent is extended or adjusted under 35 U.S.C. 154(b) by 2 days.

(21) Appl. No.: 10/814,668

(22) Filed: Apr. 1, 2004

(51) Int. Cl.[7] .............................................. B42F 00/00
(52) U.S. Cl. .............. 211/55; 297/188.06; 297/188.07; 297/188.04
(58) Field of Search ........................ 297/188.2, 188.06, 297/188.07, 188.04; 224/275, 627, 645, 655, 224/930; 211/35, 41.12, 55, 113

(56) References Cited

U.S. PATENT DOCUMENTS 2,767,895 A * 10/1956 Smith ......................... 224/275
2,843,185 A * 7/1958 Clem et al. ................. 248/164
4,585,127 A * 4/1986 Benedict ...................... 211/34
4,650,103 A * 3/1987 Mitchell ..................... 224/275
4,842,032 A 6/1989 Mastronardo
4,892,189 A 1/1990 Kunimune et al.
4,960,204 A * 10/1990 Young et al. ............... 206/235
5,375,706 A 12/1994 Perez
D359,193 S 6/1995 Minter
5,878,672 A * 3/1999 Ostermann et al. ........... 108/44
6,006,462 A * 12/1999 Lackomar .................... 40/593
6,048,023 A * 4/2000 Lampton .................... 297/129
6,149,229 A 11/2000 Dillon, Jr. et al.
6,202,839 B1 3/2001 Petersen et al.
6,216,927 B1 * 4/2001 Meritt ........................ 224/275
6,237,267 B1 5/2001 Lackomar
6,244,481 B1 * 6/2001 Brougher .................... 224/153
6,327,726 B1 * 12/2001 Weber ........................... 5/655
6,360,887 B1 3/2002 Pettey
6,375,258 B1 * 4/2002 Fang ..................... 297/188.08
6,405,909 B1 * 6/2002 Burnett et al. .............. 224/275
6,460,925 B1 * 10/2002 Kovacs .................. 297/188.04
6,763,986 B2 * 7/2004 Santos et al. ............... 224/585
2001/0037951 A1 11/2001 Garnier

* cited by examiner

*Primary Examiner*—Peter M. Cuomo
*Assistant Examiner*—Erika Garrett

(57) ABSTRACT

A digital video disc holding assembly includes a panel having a first side and a second side. A plurality of pockets is attached to the first side and each has an open upper end for selectively accessing an interior of the pockets. The plurality of pockets is arranged in a plurality of rows. Each of a plurality of flaps has an attached edge that is attached to the first side of the panel. Each of the flaps is positioned adjacent to one of the plurality of pockets and has a free end that is selectively positionable in a closed position extending over an adjacent open upper end or in closed position extending away from the panel. At least one coupler is attached to the panel for selectively attaching the panel to a vehicle chair such that the second side is abutting the chair.

11 Claims, 4 Drawing Sheets

DIGITAL VIDEO DISC HOLDING ASSEMBLY

BACKGROUND OF THE INVENTION

1. Field of the Invention

The present invention relates to video disc holding devices and more particularly pertains to a new video disc holding device for holding a plurality of digital video discs, or DVDs, against a back side of a vehicle seat and in such a way as to allow easy transportation of the DVDs.

2. Description of the Prior Art

The use of video disc holding devices and other such holding device is known in the prior art. U.S. Pat. No. 6,237,267 describes a device for holding a plurality of business cards so that they may be hung on the seat of a taxi-cab or other vehicle. Another type of holding device is U.S. Pat. No. 5,878,672 which is adapted for holding a plurality of activity devices to the back surface of a vehicle chair.

While these devices fulfill their respective, particular objectives and requirements, the need remains for a device that holds a plurality of DVDs to the back surface of a vehicle seat. Such a device is required due to the increase of DVD playing systems which are being mounted in vehicles and include view screens mounted in headrests of seat and which extend down from the vehicle ceiling. By positioning the DVDs on the back of a vehicle seat, they will be in a convenient position for reaching by a child. Additionally, it would be an advantage of such a device if it could also be used for transporting a plurality of DVDs.

SUMMARY OF THE INVENTION

The present invention meets the needs presented above by providing a panel having a plurality of pockets thereon having a size and shape adapted for holding a DVD case. The panel may be folded in half for easy transporting of DVDs when the panel is not attached to a vehicle chair.

To this end, the present invention generally comprises a panel having a first side, a second side, a bottom edge, a top edge, a first lateral edge and a second lateral edge. A plurality of pockets is attached to the first side of the panel. Each of the pockets has an open upper end for selectively accessing an interior of the pockets. The pockets each have a width equal to at least 5.50 inches, a depth equal to at least 0.50 inches and a height equal to at least 3.0 inches. The plurality of pockets is arranged in a plurality of rows extending between the first and second lateral edges. Each of a plurality of flaps has an attached edge that is attached to the first side of the panel. Each of the flaps is positioned adjacent to one of the plurality of pockets and has a free end that is selectively positionable in a closed position extending over an adjacent open upper end or in closed position extending away from the panel. A distance between each of the attached edges and a bottom of an adjacent one of the pockets is at least 7.50 inches. At least one coupler is attached to the panel for selectively attaching the panel to a vehicle chair such that the second side is abutting the chair.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
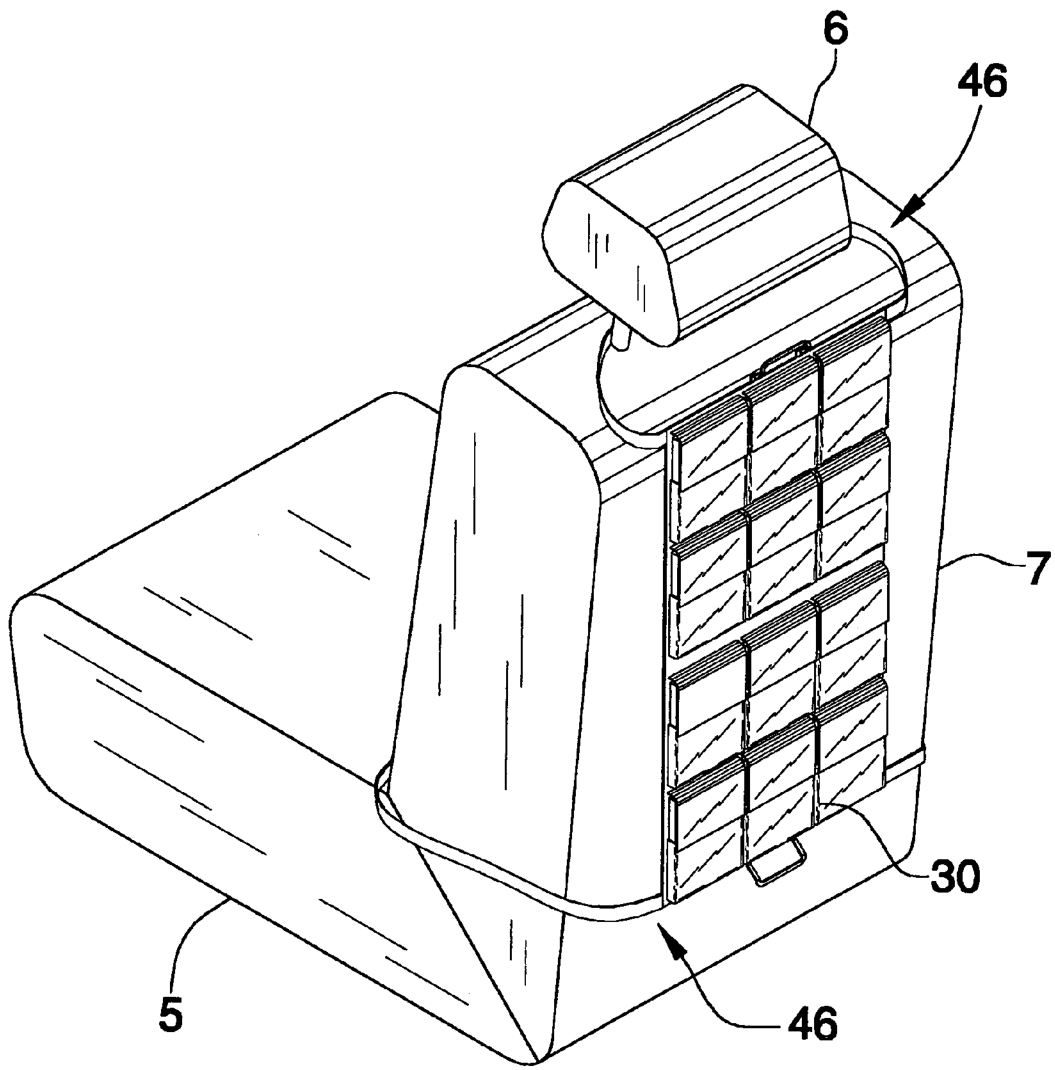
FIG. 1 is a perspective in-use view of a digital video disc holding assembly according to the present invention.
Figure 2:
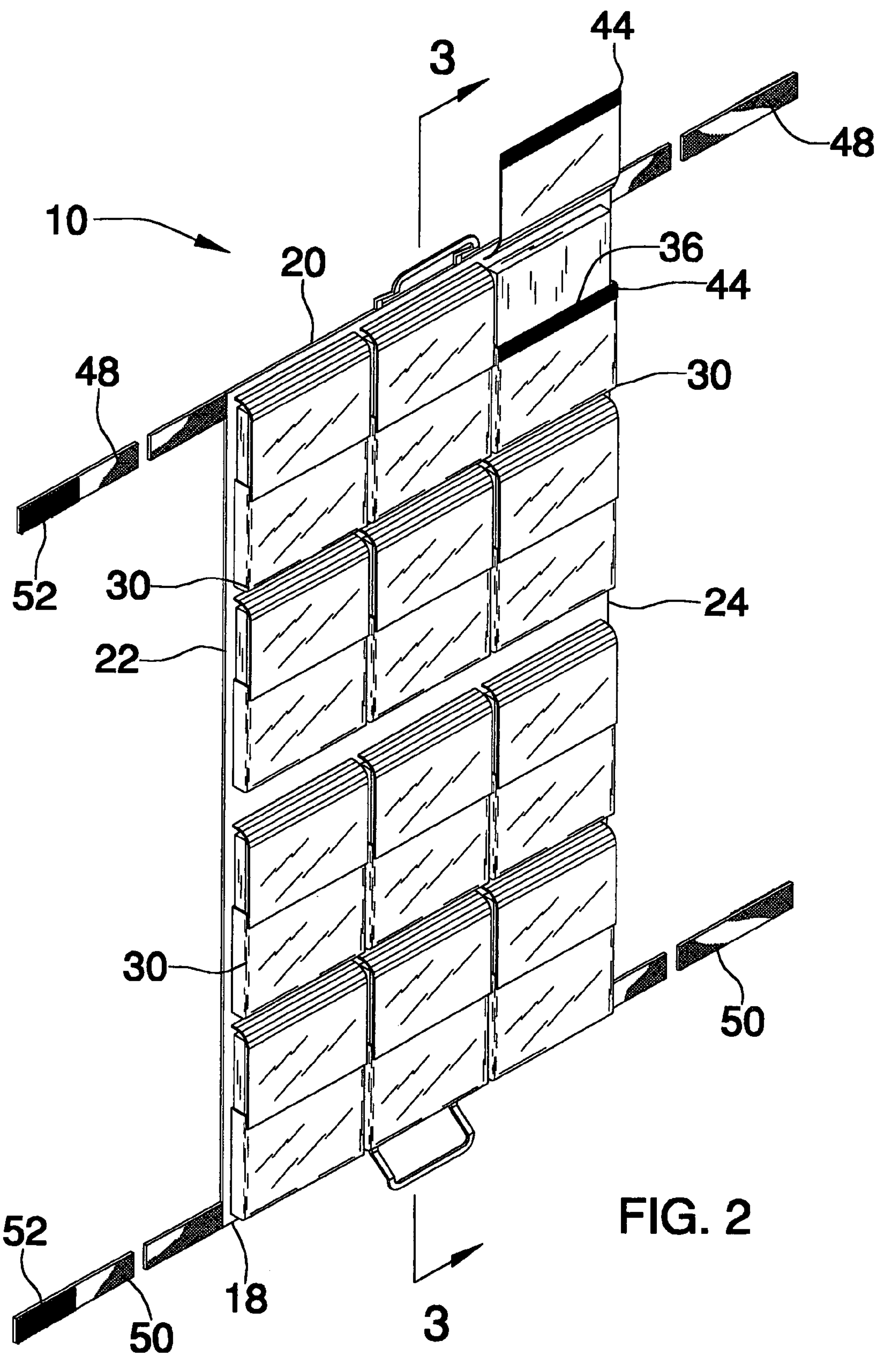
FIG. 2 is a perspective view of the present invention.
Figure 3:
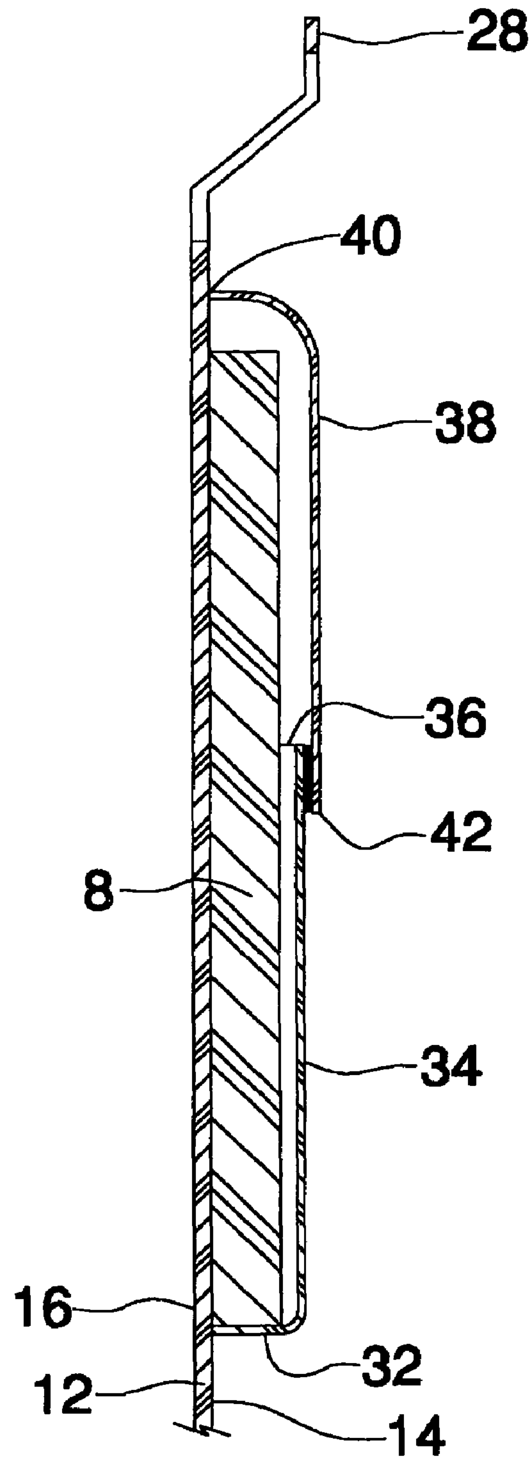
FIG. 3 is a cross-sectional view taken along line 3—3 of FIG. 2 of the present invention.
Figure 4:
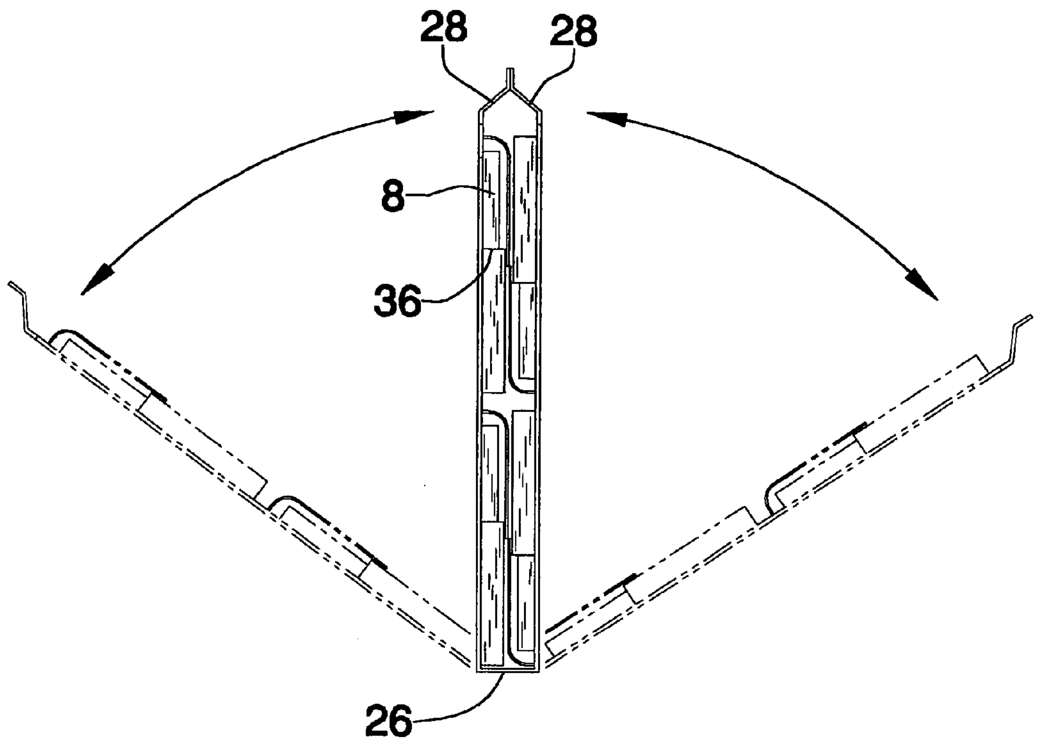
FIG. 4 is a side view of the present invention.
Figure 5:
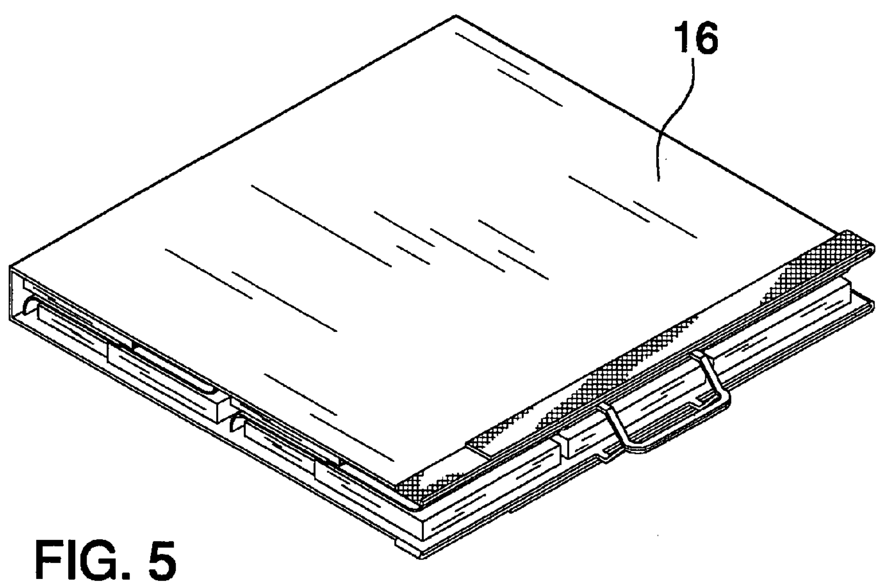
FIG. 5 is a perspective view of the present invention.

With reference now to the drawings, and in particular to FIGS. 1 through 5 thereof, a new video disc holding device embodying the principles and concepts of the present invention and generally designated by the reference numeral 10 will be described.

As best illustrated in FIGS. 1 through 5, the digital video disc holding assembly 10 generally comprises a panel 12 that has a first side 14, a second side 16, a bottom edge 18, a top edge 20, a first lateral edge 22 and a second lateral edge 24. The panel 12 may be either comprised of a flexible or substantially rigid material. The panel 12 is selectively foldable along a central area 26 extending between the first 22 and second 24 lateral edges such that the top edge 20 may be selectively positioned adjacent to and aligned with the bottom edge 18. Each one of a pair of handles 28 is attached to one of the bottom 18 and top 20 edges. The handles 28 may be brought together for carrying the panel 12. Each of the handles 28 extends away from the panel 12 and is angled away from the second side 16 of the panel 12 for reasons explained below.

A plurality of pockets 30 is attached to the first side 14 of the panel 12. Each of the pockets 30 includes a bottom wall 32 and a peripheral wall 34 extending upwardly away therefrom. The pockets 30 each have an open upper end 36 for selectively accessing an interior of the pockets 30. Each of the pockets 30 has a width equal to at least 5.50 inches, a depth equal to at least 0.50 inches and a height equal to at least 3.0 inches. The width and depth allow for the positioning of DVD cases 8 into the pockets 30. The plurality of pockets 30 is arranged in a plurality of rows extending between the first 22 and second 24 lateral edges. The panel 12 preferably has an equal number of rows between the top edge 20 and the central area 26 as between the central area 26 and the bottom edge 18. There are no pockets 30 in the central area 26. Each of the rows preferably has three pockets 30 therein and the panel 12 preferably has four rows of pockets 30 positioned thereon.

Each of a plurality of flaps 38 has an attached edge 40 that is attached to the first side 14 of the panel 12. Each of the flaps 38 is positioned adjacent to one of the plurality of pockets 30. The flaps 38 each have a free end 42 that is selectively positionable in a closed position extending over an adjacent open upper end 36 or in closed position extending away from the panel 12. A distance between each of the attached edges 40 and a bottom, or bottom wall 32, of an adjacent one of the pockets 30 is at least 7.50 inches to again support the size of a conventional DVD case 8. Each of a plurality of fastening members 44 is attached to one of the flaps 38 for removably attaching the free ends 42 to the pockets 30 in the closed position. Each of the fastening members 44 preferably comprises a hook and loop fastening means, though zippers, hooks, snaps or buttons may used.

At least one, and preferably a plurality of couplers 46 is attached to the panel 12 for selectively attaching the panel 12 to a vehicle chair 5 such that the second side 16 is abutting the chair 5. The plurality of couplers 46 preferably includes a pair of couplers 46. Each of the couplers 46 includes a first pair of straps 48 positioned adjacent to the top edge 20 and a second pair of straps 50 positioned adjacent to the bottom edge 18. Securing means 52 are attached to each of the first 48 and second 50 pairs of straps for releasably attaching associated ones of the straps together such that a pair of loops is formed. The securing means 52 preferably includes hook and loop securing means through snaps or buttons may also be utilized. Each of the loops formed by the first 48 and second 50 pairs of straps is selectively positioned around the vehicle chair.

In use, the coupler 46 adjacent to the top edge 20 is extended around the headrest 6 of the vehicle seat 5 while the other coupler 46 is extended around the backrest 7 of the seat 5. This holds the panel 12 in a manner in which DVDs cases 8 held in the pockets 30 are readily accessible. The handles 28 aid in transporting the assembly with enclosed DVDs cases 8 and the handles 28 are angled so that they may come together comfortably when DVDs positioned within the pockets push the handles apart.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A digital video disc holding assembly for selectively positioning on a back side of a vehicle seat, said assembly including:

a panel having a first side, a second side, a bottom edge, a top edge, a first lateral edge and a second lateral edge, said panel is selectively foldable along a central area extending between said first and second lateral edges such that said top edge may be selectively positioned adjacent to and aligned with said bottom edge;

a plurality of pockets being attached to said first side of said panel, each of said pockets having an open upper end for selectively accessing an interior of said pockets, each of said pockets having a width equal to at least 5.50 inches, a depth each to at least 0.50 inches and a height equal to at least 3.0 inches, said plurality of pockets being arranged in a plurality of rows extending between said first and second lateral edges;

a plurality of flaps, each of said flaps having an attached edge being attached to said first side of said panel, each of said flaps being positioned adjacent to one of said plurality of pockets, each of flaps having a free end being selectively positionable in a closed position extending over an adjacent open upper end or in closed position extending away from said panel, a distance between each of said attached edges and a bottom of an adjacent one of said pockets being at least 7.50 inches;

a pair of handles, each of said handles being attached to one of said bottom and top edges, each of said handles extending away from said panel and being fixedly angled away from said second side of said panel; and a plurality of couplers being attached to said panel for selectively attaching said panel to the vehicle chair such that said second side is abutting the chair, said plurality of couplers including a first pair of straps positioned adjacent to said top edge and a second pair of straps positioned adjacent to said bottom edge, securing means being attached to each of said first and second pairs of straps for releasably attaching associated ones of said straps together such that a pair of loops is formed, each of said straps of said first pair of straps being attached to one of said first and second lateral edges, each of said straps of said second pair of straps being attached to one of said first and second lateral edges.

2. The assembly of claim 1, wherein said plurality of pockets is arranged in a plurality of rows extending between said first and second lateral edges.

3. The assembly of claim 2, wherein said panel has an equal number of rows between said top edge and said central area as between said central area and said bottom edge.

4. The assembly of claim 3, wherein each of said rows has three pockets therein.

5. The assembly of claim 3, wherein said panel has four rows of said pockets positioned thereon.

6. The assembly of claim 1, further including a plurality of fastening members, each of said fastening members being attached to one of said flaps for removably attaching said free ends in said closed position.

7. The assembly of claim 6, wherein each of said fastening members comprising a hook and loop fastening means.

8. The assembly of claim 1, further including a plurality of fastening members, each of said fastening members being attached to one of said flaps for removably attaching said free ends in said closed position.

9. The assembly of claim 8, further including a pair of handles, each of said handles being attached to one of said bottom and top edges.

10. The assembly of claim 9, wherein each of said handles extends away from said panel and being angled away from said second side of said panel.

11. A digital video disc holding assembly for selectively positioning on a back side of a vehicle seat, said assembly including:

a panel having a first side, a second side, a bottom edge, a top edge, a first lateral edge and a second lateral edge, said panel being selectively foldable along a central area extending between said first and second lateral edges such that said top edge may be selectively positioned adjacent to and aligned with said bottom edge;

a plurality of pockets being attached to said first side of said panel, each of said pockets having an open upper end for selectively accessing an interior of said pockets, each of said pockets having a width equal to at least 5.50 inches, a depth equal to at least 0.50 inches and a height equal to at least 3.0 inches, said plurality of pockets being arranged in a plurality of rows extending between said first and second lateral edges, said panel having an equal number of rows between said top edge and said central area as between said central area and said bottom edge, each of said rows having three pockets therein, said panel having four rows positioned thereon;

a plurality of flaps, each of said flaps having an attached edge being attached to said first side of said panel, each of said flaps being positioned adjacent to one of said plurality of pockets, each of flaps having a free end being selectively positionable in a closed position extending over an adjacent open upper end or in closed position extending away from said panel, a distance between each of said attached edges and a bottom of an adjacent one of said pockets being at least 7.50 inches;

a plurality of fastening members, each of said fastening members being attached to one of said flaps for removably attaching said free ends in said closed position, each of said fastening members comprising a hook and loop fastening means;

a plurality of couplers being attached to said panel for selectively attaching said panel to the vehicle chair such that said second side is abutting the chair, said plurality of couplers including a pair of couplers, each of said couplers including a first pair of straps positioned adjacent to said top edge and a second pair of straps positioned adjacent to said bottom edge, securing means being attached to each of said first and second pairs of straps for releasably attaching associated ones of said straps together such that a pair of loops is formed, each of said loops being selectively positioned around the vehicle chair; and a pair of handles, each of said handles being attached to one of said bottom and top edges, each of said handles extending away from said panel and being angled away from said second side of said panel.

* * * * *